United States Patent
Kovalick et al.

(10) Patent No.: US 12,385,518 B2
(45) Date of Patent: Aug. 12, 2025

(54) GREASEABLE HINGE FOR A SNOW WING

(71) Applicant: Caterpillar Inc., Peoria, IL (US)

(72) Inventors: Benjamin J. Kovalick, Chillicothe, IL (US); Bruce Raymond Vahling, Urbana, IL (US)

(73) Assignee: Caterpillar Inc., Peoria, IL (US)

( * ) Notice: Subject to any disclaimer, the term of this patent is extended or adjusted under 35 U.S.C. 154(b) by 803 days.

(21) Appl. No.: 17/651,928

(22) Filed: Feb. 22, 2022

(65) Prior Publication Data

US 2023/0265879 A1    Aug. 24, 2023

(51) Int. Cl.
*F16C 11/04*    (2006.01)
*E01H 5/06*    (2006.01)
*F16N 21/00*    (2006.01)

(52) U.S. Cl.
CPC .............. *F16C 11/04* (2013.01); *E01H 5/061* (2013.01); *E01H 5/067* (2013.01); *F16N 21/00* (2013.01); *F16N 2210/04* (2013.01)

(58) Field of Classification Search
CPC ........ E01H 5/061; E01H 5/067; E02F 3/7613; E02F 3/815; B21D 28/32; B21D 53/02; F16N 21/00; F16C 114/0614
See application file for complete search history.

(56) References Cited

U.S. PATENT DOCUMENTS

| | | | |
|---|---|---|---|
| 3,659,363 A * | 5/1972 | Snyder | E01H 5/067 37/231 |
| 3,720,010 A * | 3/1973 | Coates | E01H 5/067 172/780 |
| 4,052,871 A * | 10/1977 | Persik | B21D 28/32 83/633 |
| 5,771,538 A * | 6/1998 | Huppert, Sr. | E05D 11/02 16/386 |
| 6,249,992 B1 * | 6/2001 | Irving | E02F 3/7659 172/791 |
| 7,407,016 B1 | 8/2008 | Kvalo | |
| 8,732,990 B1 | 5/2014 | Danreuther | |
| 9,752,293 B2 | 9/2017 | Dubiel et al. | |
| 2006/0059727 A1 | 3/2006 | Yoder | |
| 2006/0073935 A1* | 4/2006 | Imanishi | F16H 15/38 476/46 |
| 2013/0206513 A1 | 8/2013 | Webb et al. | |
| 2020/0407941 A1 | 12/2020 | Strashny et al. | |

FOREIGN PATENT DOCUMENTS

WO    2020189126 A1    9/2020

* cited by examiner

*Primary Examiner* — Christopher J Sebesta
*Assistant Examiner* — Robert E Pezzuto
(74) *Attorney, Agent, or Firm* — Harrity & Harrity, LLP (57) ABSTRACT

In some implementations, coupling system for rotatably coupling a moldboard of a snow wing assembly includes a hinge for rotatably coupling the moldboard to a linkage assembly to enable the moldboard to rotate in a first rotational direction, the hinge including a plate having a first face and a second face. The plate includes a first passageway extending between the first face and the second face to facilitate lubricant being supplied to a first interface between the plate and the moldboard. The coupling system may include a pin extending through the moldboard and the plate to rotatably couple the moldboard with the hinge. The pin enables the moldboard to rotate in a second rotational direction about a rotational axis defined by a body of the pin, and the body includes a second passageway extending from a bottom portion of the pin to an outer surface of the pin.

20 Claims, 3 Drawing Sheets

GREASEABLE HINGE FOR A SNOW WING

TECHNICAL FIELD

The present disclosure relates generally to a coupling system for coupling a snow wing to a motor grader and, for example, to a greaseable hinge for the snow wing.

BACKGROUND

Different components may be coupled (e.g., rotatably) to one another via couplers or coupling systems or assemblies. For example, one or more components of a machine may be rotatably coupled to facilitate operation of the machine. As an example, machines, such as grader machines (e.g., motor graders), may use a snow wing (e.g., often including a moldboard or other snow blade) to displace, move, distribute, and/or grade snow and/or other material. The snow wing may need to be moved to various positions relative to a work surface and/or the grader machine to effectively carry out one or more of the functions described above and/or to enable other operations of the grader machine. For example, the snow wing may be mounted on a side of a cab of the grader machine and may need to be moved to various positions to enable the grader machine to operate without using the snow wing and/or to enable an operator to enter or exit the cab.

To enable the snow wing to be moved to various positions, the snow wing may be rotatably coupled to the grader machine (e.g., to an undercarriage assembly of the grader machine). For example, the snow wing may be rotatably mounted to a hinge to enable the snow wing to rotate in a first rotational direction. The hinge may be rotatably mounted to another assembly of the grader machine to enable the snow wing to rotate in a second rotational direction. To facilitate the coupling of the snow wing (e.g., a moldboard of the snow wing) to the hinge, a coupling assembly may be used. The coupling assembly may include a pin that is passed through the moldboard and the hinge to rotatably couple the moldboard with the hinge (e.g., via a nut, such as a castle nut). However, over time, the coupling assembly and/or pin may become susceptible to seizure within the components (e.g., the moldboard and/or the hinge) via which they contact (e.g., due to the harshness of conditions in which the grader machine operates).

The hinge and/or coupling system of the present disclosure solves one or more of the problems set forth above and/or other problems in the art.

SUMMARY

In some implementations, a hinge for a rotatably coupling a linkage assembly of a motor grader with a moldboard of a snow wing assembly of the motor grader includes a first plate configured to mate with a second plate of the moldboard, the first plate including a first grease passageway to enable grease to pass from a first surface of the first plate to a second surface of the first plate, wherein the second surface is configured to mate with the second plate of the moldboard; and a pin having a cylindrical body, that defines a rotational axis, extending approximately perpendicular with respect to the second surface of the first plate, wherein the pin passes through the first plate and the second plate to rotatably couple the linkage assembly to the snow wing assembly to enable the moldboard to rotate with respect to the rotational axis, and wherein the cylindrical body includes a second grease passageway to enable grease to pass from a bottom surface of the cylindrical body to an outer surface of the cylindrical body.

In some implementations, a coupling system for rotatably coupling a moldboard of a snow wing assembly includes the moldboard having a curved surface and a first plate disposed on a backside of the curved surface; a linkage assembly for attaching the snow wing assembly to a motor grader, the linkage assembly configured to raise or lower the moldboard; a hinge for rotatably coupling the moldboard to the linkage assembly to enable the moldboard to rotate in a first rotational direction, the hinge including a second plate having a first face and a second face, wherein the second plate is configured to mate with the first plate of the moldboard; and wherein the second plate includes a first passageway extending between the first face and the second face to facilitate lubricant being supplied to a first interface between the first plate and the second plate; and a pin extending through the moldboard, the first plate, and the second plate to rotatably couple the moldboard with the hinge, wherein the pin enables the moldboard to rotate in a second rotational direction about a rotational axis defined by a body of the pin, and wherein the body of the pin includes a second passageway extending from a bottom portion of the pin to an outer surface of the pin.

In some implementations, a motor grader includes a snow wing assembly including a moldboard, the moldboard including a curved surface, a first plate disposed proximate to a backside of the curved surface, and an aperture; a linkage assembly configured to link the snow wing assembly to an undercarriage assembly of the motor grader; a hinge for rotatably coupling the moldboard to the linkage assembly, the hinge including a second plate having a first face and a second face, wherein the second face of the second plate is configured to mate with a surface of the first plate of the moldboard; and a pin extending through the aperture of the moldboard, the first plate, and the second plate to rotatably couple the moldboard with the hinge, wherein the pin enables the moldboard to rotate in a first rotational direction about a rotational axis defined by a cylindrical body of the pin, wherein at least one of the cylindrical body of the pin or the second plate of the hinge includes a grease passageway to facilitate a supply of grease to one or more interfaces associated with the moldboard, the hinge, or the pin.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

This disclosure relates to a hinge and/or coupling system, which is applicable to any machine that includes a mounted snow wing. For example, the machine may be a grader machine (e.g., a motor grader), a plow truck, a dump truck, a dozer, a backhoe loader, a tractor, an excavator, or another vehicle. In other words, although examples are described herein in connection with a motor grader, the hinge and/or coupling system described herein may be similarly applied to any machine that includes a mounted snow wing.

Figure 1:
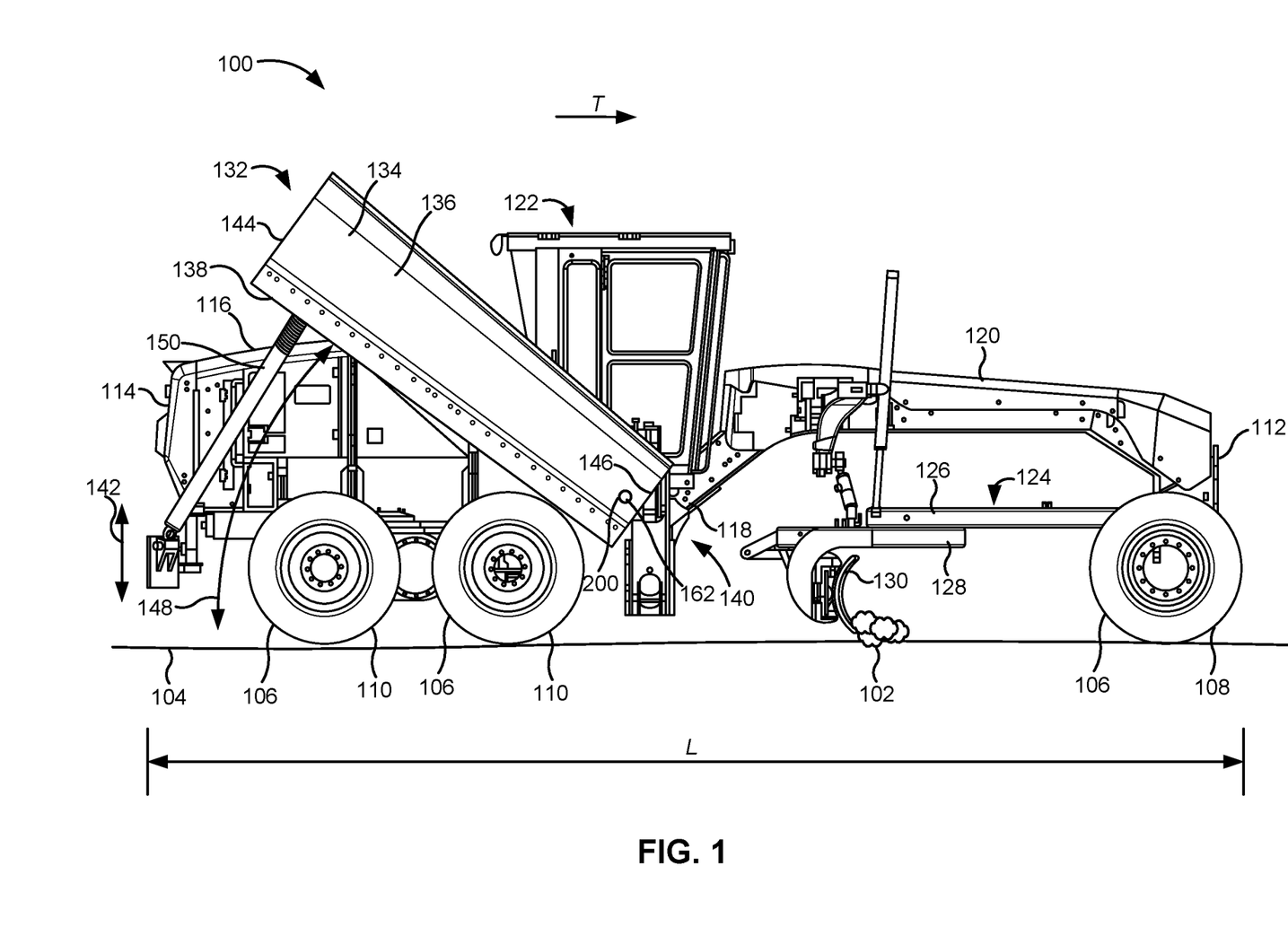
FIG. 1 is a side view of a motor grader described herein.

FIG. 1 is a side view of a motor grader 100 described herein. The motor grader 100 may also be referred to as a grader machine, among other examples. The motor grader 100 may be used to displace, spread, distribute, level, and grade materials 102, such as snow or soil, over a work surface 104. Generally, a grading operation is performed during machine movement, and for this purpose, the motor grader 100 may include traction devices 106 that facilitate machine movement over the work surface 104. For example, traction devices 106 include a set of front wheels 108 disposed towards a front end 112 of the motor grader 100 and a set of rear wheels 110 disposed towards a rear end 114 of the motor grader 100. The terms "front" and "rear", as used herein, are in relation to an exemplary direction of travel of the motor grader 100, as represented by arrow, T, in FIG. 1, with the direction of travel being exemplarily defined from the rear end 114 towards the front end 112. The motor grader 100 defines a length, L, between the front end 112 and the rear end 114.

A movement of the traction devices 106 (e.g., a rotation of the set of front wheels 108 and the set of rear wheels 110) may be powered by a power source, such as an engine (not shown in FIG. 1), housed in a power compartment 116 of the motor grader 100. Further, the motor grader 100 may include a main frame portion 118 and a sub-frame portion 120. The main frame portion 118 may also be referred to herein as an undercarriage assembly of the motor grader 100. The sub-frame portion 120 may be movable relative to the main frame portion 118. Further, the motor grader 100 may include an operator cab 122 supported on the sub-frame portion 120. The operator cab 122 may house various controls of the power source and other functions of the motor grader 100.

To grade and level the materials 102, the motor grader 100 may include a drawbar-circle-blade (DCB) arrangement or a drawbar-circle-moldboard (DCM) arrangement, which may also be referred to as a grader group 124. The grader group 124 may be supported by the sub-frame portion 120, and may include a drawbar 126, a circle member 128, and a blade 130 (referred to as a moldboard), each of which may function in concert to perform a grading operation on the work surface 104.

As shown in FIG. 1, the motor grader 100 may also include a snow wing assembly 132 mounted on the motor grader 100. For example, the snow wing assembly 132 may be mounted to the main frame portion 118. The snow wing assembly 132 may be mounted on a side of the motor grader 100 (e.g., on a side of the operator cab 122). For example, as shown in FIG. 1, the snow wing assembly 132 may be mounted on the right hand side of the operator cab 122 relative to the direction of travel T. In other examples, the snow wing assembly 132 may be mounted on the left hand side of the operator cab 122 relative to the direction of travel T. The snow wing assembly 132 may include a moldboard 134. The moldboard 134 may also be referred to as a blade, a plow, and/or a snowplow, among other examples. The moldboard 134 may include a surface 136, such as a curved surface or a concave surface, that may help receive and agglomerate the materials 102 over the work surface 104. As an example, the moldboard 134 may define an edge 138 at a bottom end (e.g., closer to the work surface 104) of the surface 136 to help engage and scrape the materials 102 off the work surface 104 and distribute, level, and grade the work surface 104, during a grading operation.

The snow wing assembly 132 may be mounted to the motor grader 100 via a linkage assembly 140. The linkage assembly 140 may be coupled to the motor grader 100 (e.g., via the main frame portion 118). The linkage assembly 140 may be configured to link the snow wing assembly 132 to an undercarriage assembly (e.g., the main frame portion 118) of the motor grader 100. The linkage assembly 140 may include one or more lifting mechanisms, such as one or more actuators (e.g., hydraulic actuators and/or pneumatic actuators) configured to raise and/or lower the snow wing assembly along a direction 142. The direction 142 may be referred to as a bench height. The linkage assembly 140 may include a mast (e.g., that may include a bar along which the snow wing assembly 132 is raised and/or lowered). In other examples, the linkage assembly 140 may be a mast-less assembly, such as a four-bar linkage assembly.

The snow wing assembly 132 may enable the motor grader 100 to perform a benching application, which may involve grading and/or distributing materials 102 from an elevated surface (e.g., elevated relative to the work surface 104). For example, the moldboard 134 may be used to remove, grade, or distribute snow from a top portion of a bank. The moldboard 134 may include an outboard end 144 and an inboard end 146. "Outboard" and "inboard" may be relative to the motor grader 100 and/or the operator cab 122. For example, the moldboard 134 may have an approximately rectangular configuration having two long edges (e.g., the edge 138 and the corresponding edge approximately parallel to the edge 138) and two short edges (e.g., at the outboard end 144 and the inboard end 146). As shown in FIG. 1, the snow wing assembly 132 may be coupled to the linkage assembly 140 proximate to the inboard end 146 of the moldboard 134. In other words, the moldboard 134 may be coupled to the linkage assembly 140 proximate to one of the short edges (e.g., at the outboard end 144 and the inboard end 146) of the moldboard 134.

The snow wing assembly 132 may be coupled to the linkage assembly 140 via a coupling system 200. The coupling system 200 is depicted and described in more detail in connection with FIGS. 2 and 3. The coupling system 200 may enable the snow wing assembly 132 to rotate in multiple rotational directions. For example, the coupling system 200 may enable the snow wing assembly 132 (e.g., and the moldboard 134) to rotate in a first rotational direction 148 (e.g., about a rotational axis 202 defined by a pin 204 of the coupling system 200, depicted in FIG. 3). For example, the snow wing assembly 132 may include an actuator 150, such as a hydraulic actuator or a pneumatic actuator, among other examples. The actuator 150 may be coupled to the main frame portion 118 (e.g., proximate to the rear end 114 of the motor grader 100) and to the moldboard 134 (e.g., proximate to the outboard end 144 of the moldboard 134). The actuator 150 may be configured to raise and/or lower the outboard end 144 of the moldboard 134 to cause the moldboard 134 to rotate about the rotational axis 202 (e.g., in the first rotational direction 148). This may enable the moldboard 134 to adapt to different angles of terrain of a working surface of the moldboard 134.

The coupling system 200 may also enable the snow wing assembly 132 (e.g., and the moldboard 134) to rotate in a second rotational direction 152 (not shown in FIG. 1). The second rotational direction 152 may enable the outboard end 144 of the moldboard 134 to move closer to and/or further from the motor grader 100 (e.g., from the operator cab 122 of the motor grader 100). For example, the inboard end 146 of the moldboard 134 may be fixed at the coupling system 200, and the outboard end 144 of the moldboard 134 may be free to rotate in the first rotational direction 148 and the second rotational direction 152. The coupling system 200 may enable the moldboard 134 to rotate in the second rotation direction 152 via a hinge 206 that is rotatably coupled to the linkage assembly 140 (e.g., as depicted and described in more detail in connection with FIGS. 2 and 3). The second rotational direction 152 may enable the snow wing assembly 132 to be placed into an operational state (e.g., with the outboard end 144 of the moldboard 134 extended away from the operator cab 122) or a stored state (e.g., with the outboard end 144 of the moldboard 134 rotated proximate to the operator cab 122). For example, the stored state may enable the motor grader 100 to operate without the snow wing assembly protruding from the side of the motor grader 100.

As indicated above, FIG. 1 is provided as an example. Other examples may differ from what is described with regard to FIG. 1.

Figure 2:
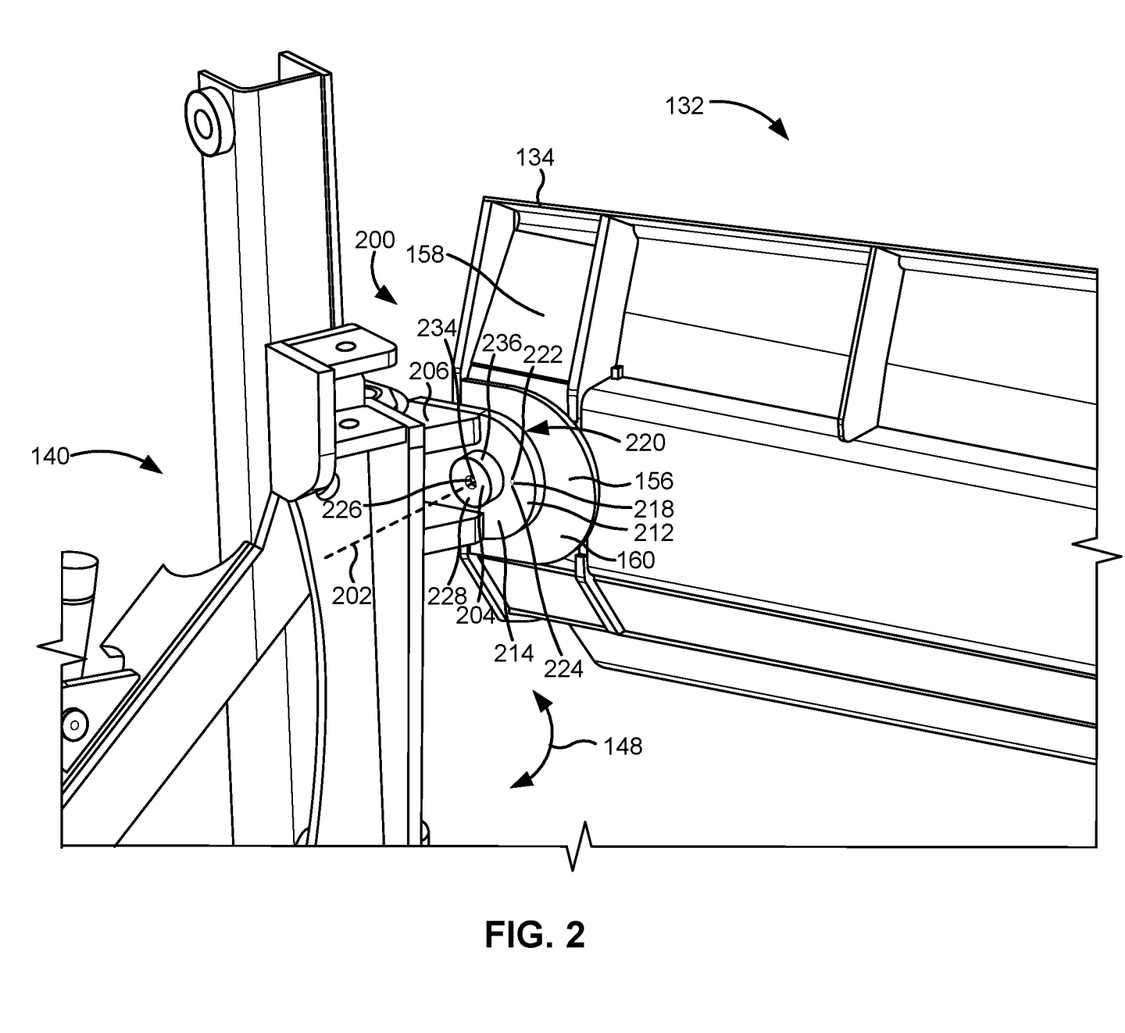
FIG. 2 is a perspective view of a coupling system described herein.

FIG. 2 is a perspective view of the coupling system 200 described herein. The perspective view depicted in FIG. 2 is a back perspective view of the coupling system 200. As shown in FIG. 2, the coupling system 200 may include the hinge 206 rotatably coupled to the moldboard 134 via the pin 204. The pin 204 may include a substantially cylindrical body 208 (shown in FIG. 3) that defines a rotational axis 202. The rotational axis 202 may define an axis from which the first rotational direction 148 is defined (e.g., the coupling system 200 may enable the enable the moldboard 134 to rotate with respect to the rotational axis 202 in the first rotational direction 148).

The hinge 206 may be rotatably coupled to the linkage assembly 140. The hinge 206 may be configured to rotate in the second rotational direction 152 (shown in FIG. 3) (e.g., about a rotational axis that is substantially perpendicular to the rotational axis 202) via the rotatable connection with the linkage assembly 140. For example, the linkage assembly 140 may include a bar 154 (e.g., depicted in FIG. 3). The hinge 206 may be rotatably coupled around the bar 154 to enable the hinge 206 to rotate in the second rotational direction 152. The hinge 206 may be moveably connected to the linkage assembly 140 to enable the hinge 206 to move relative to the linkage assembly 140 in the direction 142 (shown in FIG. 1) (e.g., that is substantially perpendicular to the rotational axis 202). For example, the hinge 206 may be configured to slide along the bar 154 in the direction 142 to enable the bench height of the moldboard 134 to be changed.

The moldboard 134 may include a plate 156. The plate 156 may facilitate a connection with the hinge 206. For example, the plate 156 may provide an approximately flat or smooth surface on the back side 158 of the moldboard 134 to provide a mating surface between the moldboard 134 and the hinge 206 (e.g., because the moldboard 134 may have a curved or concave configuration, as described above). The hinge 206 may include a plate 212. The plate 212 may include a first surface 214 (e.g., a first side or a first face) and a second surface 216 (e.g., a second side or a second face). As shown in FIG. 2, the plate 212 may be configured to mate with the plate 156 of the moldboard 134 (e.g., to facilitate a connection between the moldboard 134 and the hinge 206). For example, the second surface 216 may be configured to mate with a surface 160 of the plate 156. As described above, the connection between the moldboard 134 and the hinge 206 (e.g., between the plate 156 and the plate 212) may be a rotatable connection in that the moldboard 134 is configured to rotate in the first rotational direction 148 while the hinge 206 remains static with respect to the first rotational direction 148 (e.g., does not rotate in the first rotational direction 148).

The plate 212 may include one or more passageways 218 (e.g., grease passageways and/or lubricant passageways). For example, the one or more passageways 218 may be apertures or tunnels through the plate 212. The one or more passageways 218 may enable grease and/or lubricant to pass from the first surface 214 (e.g., the first side) of the plate 212 to the second surface 216 (e.g., the second side) of the plate 212. In other words, the one or more passageways 218 may provide a passageway from the first surface 214 of the plate 212 to a first interface 220 of the coupling system 200 (e.g., between the plate 212 and the plate 156). A passageway 218 may include an inlet 222 disposed on the first surface 214. The inlet 222 may be an opening or an aperture in the first surface 214. In some examples, the first surface 214 may include multiple inlets 222. In other examples, the first surface 214 may include a single inlet 222 that is connected to a single passageway 218 or to multiple passageways 218. The plate 212 may include a fitting 224 disposed at an inlet 222 of a passageway 218. The fitting 224 may be a grease fitting, a lubricant fitting, a grease zerk, a grease nipple, and/or a zerk fitting, among other examples. The fitting 224 may enable grease or other lubricant to be received within the passageway 218 (e.g., the fitting 224 may provide a connection for a grease gun or other component to deliver grease or lubricant into the passageway 218). In some examples, each inlet 222 may include a fitting 224 disposed at the inlet 222.

The pin 204 may include one or more passageways 226 (e.g., grease passageways and/or lubricant passageways). For example, a passageway 226 may be an aperture or tunnel through the pin 204. The one or more passageways 226 may enable grease and/or lubricant to pass from a bottom surface 228 of the body 208 of the pin 204 to an outer surface 230 (shown in FIG. 3) of the body 208 of the pin 204. In other words, the one or more passageways 226 may provide a passageway from bottom surface 228 of the pin 204 to a second interface 232 of the coupling system 200 (e.g., between the pin 204 and the moldboard 134). A passageway 226 may include an inlet 234 disposed at the bottom surface 228 of the pin 204. The inlet 234 may be an opening or an aperture through which grease or other lubricant is enabled to be received within the passageway 226.

For example, the pin 204 may pass through the plate 212 and the plate 156 to rotatably couple the linkage assembly 140 to the snow wing assembly 132 and to enable the moldboard 134 to rotate with respect to the rotational axis 202 (e.g., in the first rotational direction 148). The moldboard 134 may include an aperture 162 (e.g., also shown in FIG. 1). The aperture 162 may be configured to rotatably receive the pin 204. The pin 204 may extend through the aperture 162, the plate 212, and the plate 156 to enable the moldboard 134 to be rotatably coupled to the hinge 206. The second interface 232 may be between the outer surface 230 of the pin 204 and an inner surface of the aperture 162 of the moldboard 134. The moldboard 134 may be configured to rotate in the first rotational direction 148 while the pin 204 remains relatively static with respect to the first rotational direction 148.

The pin 204 may include a bottom portion 236. The bottom portion 236 may have a first cross-sectional area that is larger than a second cross-sectional area of the body 208. The bottom portion 236 may be configured to contact the first surface 214 of the plate 212 to restrict a movement of the pin 204. For example, the bottom portion 236 may at least partially restrict a movement of the pin 204 in a direction parallel to the rotational axis 202 (e.g., by contacting the first surface 214 of the plate 212). The bottom portion 236 may be integrally attached to the body 208. In some examples, the bottom portion 236 may be removable from the body 208 of the pin 204. For example, the bottom portion 236 of the pin 204 may be connected to the body 208 via a threaded connection or another means that enables the bottom portion 236 to be removed from the body 208.

As indicated above, FIG. 2 is provided as an example. Other examples may differ from what is described with regard to FIG. 2.

Figure 3:
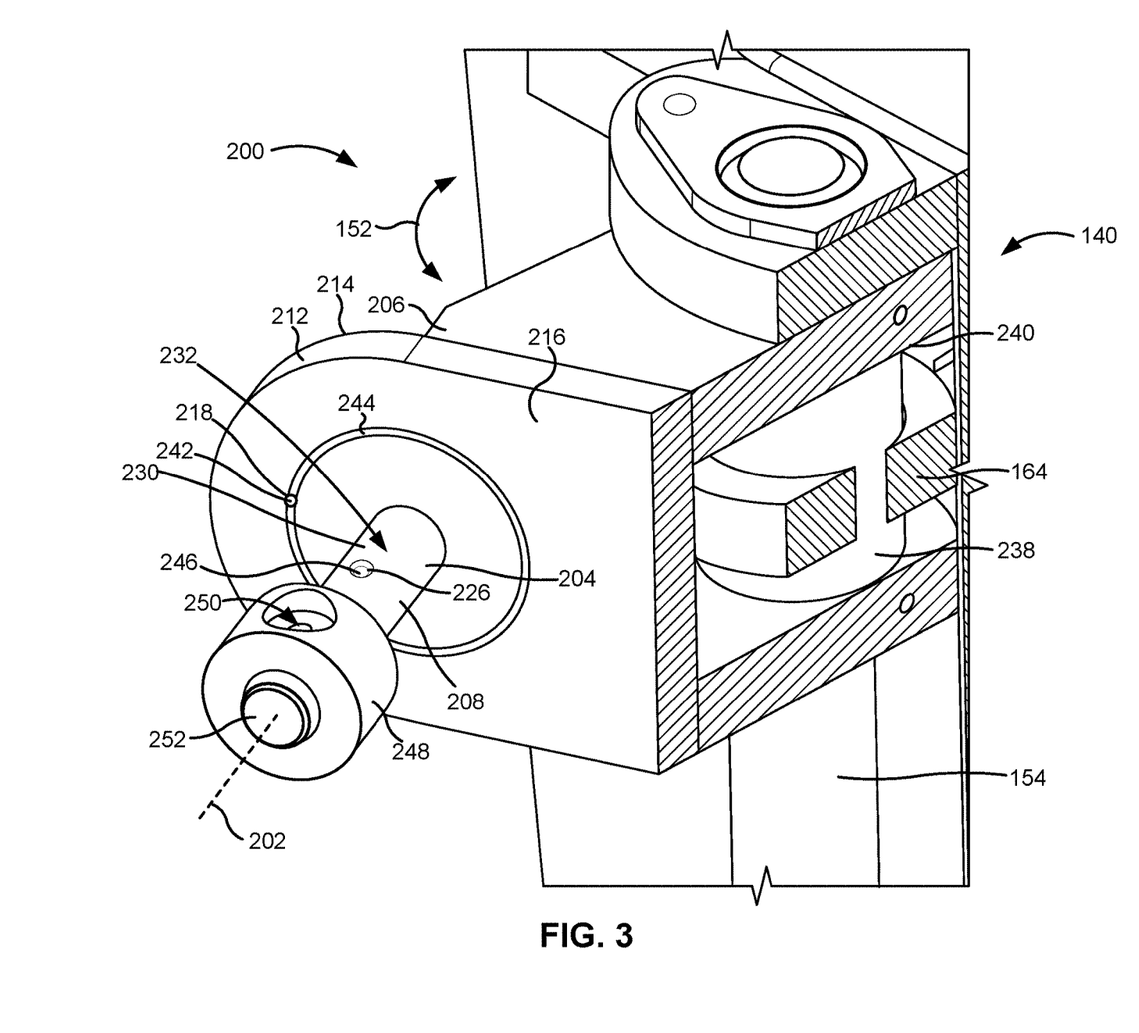
FIG. 3 is a perspective view of a coupling system described herein.

FIG. 3 is a perspective view of the coupling system 200 described herein. The perspective view depicted in FIG. 3 is a front perspective view of the coupling system 200. FIG. 3 does not depict the moldboard 134. However, it should be understood that the moldboard 134 may be configured in the coupling system 200 in a similar manner as depicted and/or described above (e.g., rotatably coupled to the pin 204 and/or the hinge 206).

In some implementations, the hinge 206 may include a sleeve 238. The sleeve 238 may be slidably mounted to the bar 154. For example, the sleeve 238 may be configured around the bar 154 to enable the hinge 206 to slide along the bar 154. In some examples, the linkage assembly 140 may include a collar 164 coupled to an actuator (e.g., a hydraulic actuator or cylinder) of the linkage assembly 140. The actuator may be configured to raise and/or lower the collar 164. The collar 164 may raise and/or lower the hinge 206 along the bar 154 by coming into contact with a top surface 240 of the hinge 206. In some other implementations, the hinge 206 may be coupled to the linkage assembly 140 such that the hinge 206 is not enabled to move relative to the linkage assembly 140 (e.g., the hinge 206 may be immovably coupled to the linkage assembly 140).

The hinge 206 may be enabled to rotate in the second rotational direction 152. For example, the sleeve 238 may be configured to rotate about the bar 154. In other words, the second rotational direction 152 may be defined by an axis of the bar 154. By enabling the hinge 206 to rotate in the second rotational direction 152, the coupling system 200 may enable the moldboard 134 (and/or the snow wing assembly 132) to rotate in the second rotational direction.

The hinge 206 may include one or more outlets 242 for the one or more passageways 218 of the hinge 206. For example, the one or more outlets 242 may be disposed on the second surface 216 of the plate 212 (e.g., the surface associated with the first interface 220). For example, a passageway 218 may include a single inlet 222 and a single outlet 242. In some other examples, a passageway 218 may include a single inlet 222 and multiple outlets 242 (e.g., dispersed around the second surface 216). The outlet(s) 242 may enable grease and/or other lubricant to be received in the first interface 220 (e.g., between the plate 212 of the hinge 206 and the plate 156 of the moldboard 134). Multiple outlets 242 may improve a disbursement of grease or lubricant about the first interface 220.

In some examples, the hinge 206 may include one or more grooves 244. The one or more grooves 244 may be disposed on the second surface 216 of the plate 212. A groove 244 may extend into the plate 212 from the second surface 216. For example, the one or more grooves 244 may be channels or trenches disposed on the second surface 216. The one or more grooves 244 may be referred to as grease grooves. For example, a groove 244 may provide a path for grease or other lubricant provided to the second surface 216 to facilitate a disbursement of the grease or other lubricant around the second surface 216. In other words, the second surface 216 may include one or more grooves 244 extending into the plate 212 to facilitate a distribution of lubricant in the first interface 220. For example, an outlet 242 of a passageways 218 may be disposed at, or proximate to, a groove 244 (e.g., a passageway 218 may include one or more openings in the second surface 216 disposed at the one or more grooves 244). In some examples, as shown in FIG. 3, a groove 244 may be an approximately circular groove or circular channel (e.g., about the pin 204). In other examples, a groove 244 may follow a straight line, may have a rectangular configuration, or another configuration.

The pin 204 may have a substantially cylindrical body 208 (e.g., the pin 204 may have a substantially cylindrical configuration). The pin 204 may extend through an aperture in the plate 212. Similarly, the pin 204 may extend through the aperture 162 of the moldboard 134. In some examples, the pin 204 may be statically received in the aperture in the plate 212 and rotatably received in the aperture 162 of the moldboard 134. In other examples, the pin 204 may be rotatably received in both the aperture in the plate 212 and the aperture 162 of the moldboard 134. The pin 204 may include one or more outlets 246 disposed on the outer surface 230 of the pin 204 (e.g., of the body 208). The outlet(s) 246 may be outlets for the passageway 226 of the pin 204. For example, the pin 204 may include one or more apertures in the outer surface 230 of the body 208 defining the one or more outlets 246 for the passageway 226.

The outlet(s) 246 may facilitate a passage of grease or lubricant from the bottom surface 228 to the outer surface 230 via the passageway 226. In some examples, the pin 204 may include a single outlet 246. In other examples, the pin 204 may include multiple outlets 246. For example, the pin 204 may include a single passageway 226 with multiple branches, each branch leading to an outlet 246 in the outer surface 230 of the body 208. The pin 204 may include a top surface 252. As shown in FIG. 3, the top surface 252 may be sealed. As a result, when grease or other lubricant passes through the passageway 226, the grease or other lubricant must exit via the outlet(s) 246. Therefore, the passageway 226 and/or the outlet(s) 246 may facilitate a distribution of grease or other lubricant to the outer surface 230. In other words, the passageway 226 facilitates lubricant being supplied to the second interface 232 between the outer surface 230 of the pin 204 and an inner surface of the aperture 162 of the moldboard 134.

The pin 204 may include a head portion 248. The head portion 248 may also be referred to herein as a collar. The head portion 248 may be disposed at an opposite end of the pin 204 from the bottom portion 236. The head portion 248 may have a cross-sectional area that is larger than the cross-sectional area of the body 208. In some examples, the head portion 248 may include an aperture 250. The aperture 250 may be configured to receive a retaining bolt or other member that facilitates the coupling of the linkage assembly 140 with the moldboard 134. For example, a retaining bolt or other member may be placed within the aperture 250 to restrict a movement of the pin 204, such as in a direction parallel to the rotational axis 202 (e.g., by coming into contact with the surface 136 of the moldboard 134). For example, a retaining bolt may be disposed through the aperture 250 and the retaining bolt and/or the head portion 248 may be in contact with the curved surface of the moldboard 134 (e.g., the surface 136). In some other examples, the movement of the pin 204 may be restricted via other means, such as via only the head portion 248 coming into contact with the surface 136 of the moldboard 134 (e.g., and no retaining bolt may be included in the coupling system 200).

As indicated above, FIG. 3 is provided as an example. Other examples may differ from what is described with regard to FIG. 3.

Industrial Applicability

A motor grader 100 may use a snow wing to displace, move, distribute, and/or grade snow and/or other material. The snow wing may need to be moved to various positions relative to a work surface and/or the motor grader 100 to effectively carry out one or more of the functions described above and/or to enable other operations of the motor grader 100. For example, the snow wing may be mounted on a side of an operator cab 122 of the motor grader 100 and may need to be moved to various positions to enable the motor grader 100 to operate without using the snow wing and/or to enable an operator to enter or exit the operator cab 122.

To enable the snow wing to be moved to various positions, the snow wing may be rotatably coupled to the motor grader 100. For example, the snow wing may be rotatably mounted to a hinge to enable the snow wing to rotate in a first rotational direction. The hinge may be rotatably mounted to another assembly of the grader machine to enable the snow wing to rotate in a second rotational direction. To facilitate the coupling of the snow wing (e.g., a moldboard 134 of the snow wing) to the hinge, a coupling assembly may be used. The coupling assembly may include a pin that is passed through the moldboard and the hinge to rotatably couple the moldboard with the hinge (e.g., via a nut, such as a castle nut). However, such hinges and/or coupling assemblies do not provide any means for providing grease or lubricant to interfaces associated with the coupling assembly. Over time, the coupling assembly and/or pin may become susceptible to seizure within the components (e.g., the moldboard 134 and/or the hinge 206) via which they contact (e.g., due to the harshness of conditions in which the motor grader 100 operates). Moreover, because there are multiple interfaces between moving components of the coupling assembly, a likelihood of seizure of a component may be increased.

The coupling system 200 and/or hinge 206 described herein enables a greaseable hinge for the snow wing assembly 132 of the motor grader 100. For example, the one or more passageways 218 and/or 226 may enable grease or other lubricant to be provided to the interface(s) (e.g., the first interface 220 and/or the second interface 232) of the coupling system 200. For example, if the pin 204, the hinge 206, and/or the moldboard 134 were rotatably coupled together as described herein with no grease or lubricant therebetween, surfaces of these parts disposed in mutual contact with each other may rub against each other generating friction and heat, thus potentially causing one or more of the parts to seize relative to the other. The one or more passageways 218 and/or 226 may enable a volume of grease or lubricant to be effectively transferred to the first interface 220 and/or the second interface 232. For example, a conduit or a hose (not shown) carrying a grease or a lubricant may be fluidly coupled to the fitting 224 or the inlet 234 during servicing and repairs and the grease or lubricant may be introduced into the passageway 218 and/or the passageway 226. The grease or lubricant once introduced into the passageway 218 and/or the passageway 226 may further be forced into the first interface 220 and/or the second interface 232 via the outlet(s) 242 and/or the outlet(s) 246. Such transfer of grease or lubricant enables the parts of the coupling system 200 to bear against the (respective) surfaces defining the first interface 220 and/or the second interface 232, thereby increasing wear resistance and mitigating occurrence of premature wear of the parts of the coupling system 200. Moreover, the introduction of grease or lubricant into the first interface 220 and/or the second interface 232 may reduce a likelihood that one or more of the part of the coupling system 200 will seize due to the rotational movement of the parts.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A hinge for a rotatably coupling a linkage assembly of a motor grader with a moldboard of a snow wing assembly of the motor grader, the hinge comprising:
   a first plate configured to mate with a second plate of the moldboard, the first plate including a first grease passageway to enable grease to pass from a first surface of the first plate to a second surface of the first plate, wherein the second surface of the first plate is configured to mate with the second plate of the moldboard; and
   a pin having a cylindrical body, that defines a rotational axis, extending approximately perpendicular with respect to the second surface of the first plate, wherein the pin passes through the first plate and the second plate to rotatably couple the linkage assembly to the snow wing assembly to enable the moldboard to rotate with respect to the rotational axis, and wherein the cylindrical body includes a second grease passageway to enable grease to pass from a bottom surface of the cylindrical body to an outer surface of the cylindrical body, wherein the bottom surface of the cylindrical body is in contact with the first surface of the first plate and has a first cross-sectional area larger than a second cross-sectional area of the cylindrical body.

2. The hinge of claim 1, wherein the second surface of the first plate includes one or more channels, and wherein the first grease passageway includes one or more openings in the second surface proximate to the one or more channels to provide grease to the one or more channels.

3. The hinge of claim 2, wherein the one or more channels include a circular channel extending into the first plate about the rotational axis.

4. The hinge of claim 1, wherein the first surface of the first plate includes a grease fitting disposed at an inlet of the first grease passageway to facilitate the grease to be received within the first grease passageway.

5. The hinge of claim 1, wherein the bottom surface of the cylindrical body of the pin is disposed proximate to the first surface of the first plate, wherein the bottom surface of the cylindrical body includes an inlet for the second grease passageway, and wherein the outer surface of the cylindrical body includes one or more outlets for the second grease passageway.

6. The hinge of claim 1, wherein the pin includes a head portion comprising an aperture configured to receive a retaining bolt that facilitates a coupling of the linkage assembly with the moldboard.

7. The hinge of claim 1, wherein the hinge is moveably connected to the linkage assembly to enable the hinge to move relative to the linkage assembly in a direction that is substantially perpendicular to the rotational axis.

8. A coupling system for rotatably coupling a moldboard of a snow wing assembly, comprising:
the moldboard having a curved surface and a first plate disposed on a backside of the curved surface;
a linkage assembly for attaching the snow wing assembly to a motor grader, the linkage assembly configured to raise or lower the moldboard;
a hinge for rotatably coupling the moldboard to the linkage assembly to enable the moldboard to rotate in a first rotational direction, the hinge including a second plate having a first face and a second face, wherein the second plate is configured to mate with the first plate of the moldboard; and wherein the second plate includes a first passageway extending between the first face and the second face to facilitate lubricant being supplied to a first interface between the first plate and the second plate; and
a pin extending through the moldboard, the first plate, and the second plate at a distance away from the first passageway to rotatably couple the moldboard with the hinge, wherein the pin enables the moldboard to rotate in a second rotational direction about a rotational axis defined by a body of the pin, and wherein the body of the pin includes a second passageway extending from a bottom portion of the pin to an outer surface of the pin.

9. The coupling system of claim 8, wherein the moldboard includes an aperture configured to rotatably receive the pin, and wherein the second passageway facilitates lubricant being supplied to a second interface between the outer surface of the pin and an inner surface of the aperture.

10. The coupling system of claim 8, wherein the first interface is defined by a surface of the first plate and the second face of the second plate, and wherein the second face includes one or more grooves extending into the second plate to facilitate a distribution of the lubricant in the first interface.

11. The coupling system of claim 10, wherein the first passageway includes one or more openings in the second face disposed at the one or more grooves.

12. The coupling system of claim 8, wherein the hinge includes a lubricant fitting disposed on the first face of the second plate, wherein the lubricant fitting is disposed at an inlet of the first passageway to facilitate a supply of the lubricant to the first passageway.

13. The coupling system of claim 8, wherein the body of the pin has a substantially cylindrical configuration, a first aperture in a surface of the bottom portion of the pin defining an inlet for the second passageway, and one or more second apertures in the outer surface of the body of the pin defining one or more outlets for the second passageway.

14. The coupling system of claim 8, wherein the pin includes a collar disposed at an opposite end of the pin from the bottom portion, the collar having a first cross-sectional area that is larger than a second cross-sectional area of the body and an aperture; and
wherein the coupling system further includes a retaining bolt disposed through the aperture, wherein at least one of the retaining bolt or the collar are in contact with the curved surface of the moldboard.

15. The coupling system of claim 8, wherein the bottom portion has a first cross-sectional area that is larger than a second cross-sectional area of the body, and wherein the bottom portion is configured to contact the first face of the second plate to restrict a movement of the pin.

16. A motor grader, comprising:
a snow wing assembly including a moldboard, the moldboard including a curved surface, a first plate disposed proximate to a backside of the curved surface, and an aperture;
a linkage assembly configured to link the snow wing assembly to an undercarriage assembly of the motor grader;
a hinge for rotatably coupling the moldboard to the linkage assembly, the hinge including a second plate having a first face and a second face, wherein the second face of the second plate is configured to mate with a surface of the first plate of the moldboard, and wherein the second plate includes a first grease passageway extending between the first face and the second face of the second plate to facilitate grease being supplied to a first interface between the first plate and the second plate; and
a pin extending through the aperture of the moldboard, the first plate, and the second plate at a distance away from the first grease passageway to rotatably couple the moldboard with the hinge, wherein the pin enables the moldboard to rotate in a first rotational direction about a rotational axis defined by a cylindrical body of the pin.

17. The motor grader of claim 16, wherein the pin includes a second grease passageway extending from a bottom portion of the pin to an outer surface of the pin to facilitate grease being supplied to a second interface between the outer surface of the pin and a surface of the aperture.

18. The motor grader of claim 16, wherein the second face of the second plate includes one or more grooves configured to distribute grease to an interface between the first plate and the second plate.

19. The motor grader of claim 16, wherein the pin includes one or more outlets for the first grease passageway disposed on an outer surface of the pin.

20. The motor grader of claim 16, wherein the moldboard has a rectangular configuration; and wherein the aperture is located proximate to one of a short edge of the rectangular configuration.

* * * * *